(No Model.)
J. FLEMING, Jr.
ROLLER BEARING.
No. 538,211. Patented Apr. 23, 1895.
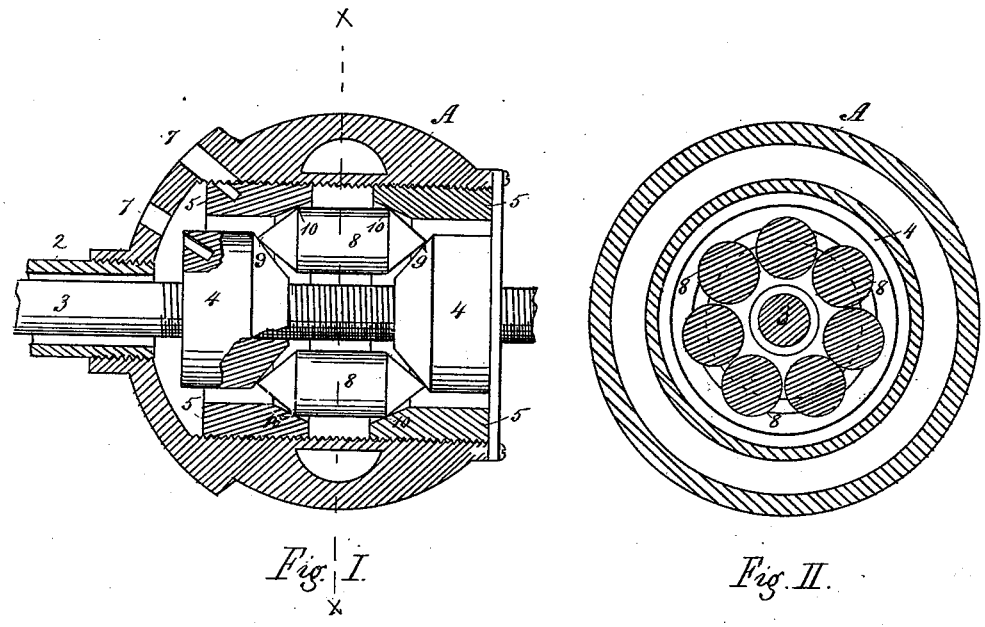
Fig. I.
Fig. II.
WITNESSES:
R. S. Millar
L. M. Adams
INVENTORS
John Fleming Jr.
BY
J. Bailey
ATTORNEY.

UNITED STATES PATENT OFFICE.

JOHN FLEMING, JR., OF HOUGHTON, MICHIGAN, ASSIGNOR OF ONE-HALF TO WALTER W. J. CROZE, OF SAME PLACE.

ROLLER-BEARING.

SPECIFICATION forming part of Letters Patent No. 538,211, dated April 23, 1895.

Application filed October 22, 1894. Serial No. 526,615. (No model.)

*To all whom it may concern:*

Be it known that I, JOHN FLEMING, Jr., a citizen of the United States, residing at Houghton, in the county of Houghton and State of Michigan, have invented a new and useful Improvement in Roller-Bearings, which improvement is fully set forth in the following specification and accompanying drawings, in which—

Figure I is a central longitudinal section of my improved roller bearing, and Fig. II, a transverse section on line $x\ x$ of Fig. I.

My invention pertains to improvements in anti-friction appliances and its object is to provide a simple, durable and efficient roller bearing adapted to distribute the frictional contacts and reduce the resistance to a minimum degree, and also to provide means whereby the surfaces exposed to wear may be easily kept in correct adjustment.

The invention comprises a series of rollers having conical ends, which bear on beveled surfaces of collars or bushings adjustably attached to the axle, while the shoulders or bases of the cones bear upon beveled surfaces of exterior bushings adjustably attached to the interior of the hub or shell which incloses the said rollers and their adjuncts.

The peculiar construction and operation of the device will be made apparent by an inspection of the drawings in which A designates a vehicle hub having an extension or sleeve 2 which encircles the axle 3. The outer extremity of the axle is threaded and carries twin collars or bushings 4, the inner or oppositely disposed faces of which are beveled as shown in the drawings. An exterior pair of bushings 5, also provided with beveled faces are threaded to engage the interior side of the shell or casing. Both pairs of bushings may be readily adjusted in their relative positions by keys which may be introduced through the openings 7. The rollers 8 are provided with conical ends which are so formed with respect to the bevel of the adjoining collars or bushings that the cones rest almost upon their extreme points as at 9. The exterior bushings 5 are so formed and adjusted as to engage only the shoulders or bases of the cones as at 10. The superincumbent weight of the vehicle is thus supported at two points in each hub and the paths in which the rollers travel being extremely narrow, all unnecessary friction is obviated.

It will be understood that the points of contact being properly hardened the wear will be inconsiderable and that a very small quantity of oil or other lubricant is required. In the event of the rollers becoming loose the bushings may be readily adjusted from either or both sides as may be desired.

What I claim as new is—

The combination, with the hub screw threaded interiorly, the screw-threaded axle, and the sleeve, of the adjustable bushings connected with the axle and having their inner faces made conical, the exterior adjustable bushings engaging with the screw threads of the hub and having their inner faces beveled, and the rollers having conical heads, the construction being such that the apices of the conical heads will bear upon the conical faces of the inner bushings while the peripheries of their bases will rest on the beveled faces of the exterior bushings, substantially as described.

In testimony that I claim the foregoing I have hereunto set my hand, this 8th day of October, 1894, in the presence of witnesses.

JOHN FLEMING, JR.

Witnesses:
JOSEPH CROZE,
WALTER W. J. CROZE.